Patented July 28, 1942

2,291,473

UNITED STATES PATENT OFFICE 2,291,473

MOTHPROOFING SOLUTION

Hilton Ira Jones, Wilmette, Ill.

No Drawing. Application October 14, 1939,
Serial No. 299,514

4 Claims. (Cl. 167—37)

The present invention relates to mothproofing solutions and more particularly to improved solutions containing salts of hydrofluosilicic acid and the method of making the same.

It has been known for some time that soluble salts of hydrofluosilicic acid were of value for use in the moth-proofing art and in 1922 applicant first placed on the market, through the Katatex Laboratories, magnesium silicofluoride crystals, for mothproofing purposes. While the salts of hydrofluosilicic acid were found to be particularly effective mothproofing agents, the aqueous solutions of the silicofluorides were not found wholly satisfactory. It was found, for example, that the available aqueous silicofluoride solutions possessed a very low textile penetration,—the disadvantages of which will be readily apparent to those skilled in the art. It was also found that a slow settling, gummy precipitate gradually formed when the silicofluoride salts were dissolved in ordinary (tap) water.

Attempts by prior investigators to improve the textile penetration and at the same time provide stable solutions without deleteriously affecting the desired characteristics of the silicofluoride have met with little success. Other attempts by prior investigators to avoid the formation of the gummy precipitate (a reaction product of the silicofluoride and the salts contained in tap water) have also met with little or no success. The formation of the gummy precipitate (which has been found practically impossible to separate by filtration) was of particular import as it made products containing, or products to be used with, ordinary city water commercially unsatisfactory.

The principal object of the present invention is to provide improved mothproofing solutions free from the disadvantages enumerated above.

Other objects of the present invention will be apparent as the description hereinafter proceeds.

During my research investigation it was found that small amounts (e. g. as low as 1 per cent) of a sodium benzene sulfonate would coagulate the gummy precipitate described above and cause the precipitate to settle in a relatively short time, leaving a perfectly clear, supernatant liquid. During my research investigation it was also found that mixtures containing concentrated solutions of magnesium silicofluoride and a sodium benzene sulfonate were unstable, i. e. that a double decomposition reaction took place, resulting in the throwing down of a relatively insoluble sodium silicofluoride precipitate.

The following outline of some of my additional investigations will serve to illustrate the present invention. About 50 pounds of a 50 per cent aqueous sodium benzene sulfonate solution was first diluted with about 2 volumes of (preferably hot) water and then 30 pounds of magnesium silicofluoride added and the total mixture stirred to effect solution. A double decomposition took place, the sodium silicofluoride precipitate settling rapidly, leaving the clear supernatant liquid with the magnesium benzene sulfonate in solution. The clear solution (separated from the precipitate, preferably by decantation) was next added to another concentrated solution of magnesium silicofluoride. The resulting solution containing as high as 16–20 per cent magnesium silicofluoride and a corresponding amount of magnesium benzene sulfonate was found to be stable. Further, it was also found that this concentrate could be diluted with ordinary tap water in any proportion (e. g. 1–11) without the formation of a precipitate.

Investigations have also shown that ammonium benzene sulfonate (prepared, for example, in a manner similar to the preparation of magnesium benzene sulfonate described above) formed stable solutions with ammonium silicofluoride. Investigations have also shown that alkaline earth metals, such as strontium and calcium, may be substituted for magnesium or ammonium in accordance with the above, although the use of such salts in the present invention is not preferred due to relatively low solubility.

Additional tests showed that in all cases mentioned above, the solutions could be improved, particularly with reference to textile penetration without deleteriously affecting stability, by providing the benzene ring with an aliphatic side chain preferably containing 6–18 carbon atoms. Examples of preferred hydrocarbon groups which may be straight or branch chained and may be in the ortho, meta or para positions, include the hexyl, octyl, decyl, dodecyl, tetradecyl, cetyl, etc. groups.

Examples of aqueous solutions coming within the scope of the present invention are:

a. Solutions containing about 16–20 per cent magnesium silicofluoride and about 5–10 per cent magnesium benzene sulfonate.

b. Solutions containing about 16–18 per cent ammonium silicofluoride and about 5–10 per cent ammonium benzene sulfonate.

c. Solutions of a and b above in which the benzene ring of the sulfonate carries an aliphatic hydrocarbon group and preferably a group containing 6–18 (inclusive) carbon atoms.

The above solutions may be diluted to any desired percentage prior to use in accordance with the usual practice. Solutions, as previously pointed out above, either in concentrated form or when diluted with ordinary city tap water are stable and of improved textile penetration.

It will be understood by those skilled in the art that the present invention directed to solutions of improved textile penetration and stability, employs water soluble salts of hydrofluosilicic acid and benzene sulfonic acid, the salt-forming group for each acid in a single solution being the same. It will also be apparent to those skilled in the art that the salts of benzene sulfonic acid for use in the present invention may be prepared by any suitable means and that the method of preparation described above is merely illustrative.

I claim:
1. A stable aqueous mothproofing solution containing as its essential ingredients magnesium silicofluoride and magnesium benzene sulfonate.
2. A solution in accordance with claim 1, in which the benzene ring of the sulfonate carries an aliphatic hydrocarbon group containing 6–18 carbon atoms.
3. A mothproofing concentrate containing about 16–20 per cent of magnesium silicofluoride and about 5–10 per cent of magnesium benzene sulfonate.
4. Solutions in accordance with claim 3, in which the benzene ring of the sulfonates carries an aliphatic hydrocarbon group containing 6–18 carbon atoms.

HILTON IRA JONES.